United States Patent
Krisbergh et al.

(10) Patent No.: US 8,089,502 B2
(45) Date of Patent: Jan. 3, 2012

(54) ADAPTIVE VIDEO TELEPHONE SYSTEM

(75) Inventors: Hal M. Krisbergh, Meadowbrook, PA (US); Joseph E. Augenbraun, Foster City, CA (US); Randell E. Jesup, Malvern, PA (US); Maire D. Reavy, Malvern, PA (US); Randall J. Gort, Malvern, PA (US); Navneeth Kannan, Westford, MA (US); Whitney D. Blackmon, Holland, PA (US); Richard W. Westerfer, Lower Gwynedd, PA (US); David E. Wachob, New Hope, PA (US)

(73) Assignee: Worldgate Service, Inc., Trevose, PA (US)

( * ) Notice: Subject to any disclaimer, the term of this patent is extended or adjusted under 35 U.S.C. 154(b) by 1041 days.

(21) Appl. No.: 11/587,994

(22) PCT Filed: Apr. 27, 2005

(86) PCT No.: PCT/US2005/014554
§ 371 (c)(1),
(2), (4) Date: Nov. 21, 2007

(87) PCT Pub. No.: WO2005/112449
PCT Pub. Date: Nov. 24, 2005

(65) Prior Publication Data
US 2008/0158333 A1 Jul. 3, 2008

Related U.S. Application Data

(60) Provisional application No. 60/566,410, filed on Apr. 30, 2004.

(51) Int. Cl.
*H04N 7/14* (2006.01)
(52) U.S. Cl. ................................ 348/14.01; 348/14.12
(58) Field of Classification Search ............. 348/14.01, 348/14.12, 14.13, 14.15; 370/260
See application file for complete search history.

(56) References Cited

U.S. PATENT DOCUMENTS

| | | | | |
|---|---|---|---|---|
| 5,367,331 A | * | 11/1994 | Secher et al. | 348/14.01 |
| 6,111,915 A | * | 8/2000 | Fukunaga et al. | 375/240.12 |
| 6,154,489 A | * | 11/2000 | Kleider et al. | 375/221 |
| 2004/0233844 A1 | * | 11/2004 | Yu et al. | 370/230 |

* cited by examiner

*Primary Examiner* — Stella Woo
(74) *Attorney, Agent, or Firm* — Morgan, Lewis & Bockius LLP

(57) ABSTRACT

A videophone system providing high resolution video transmission between videophones utilizes compressed video signals and audio signals which may be transmitted through any communications network, with the system providing real time adaptive error recovery and synchronization between the audio and video signals to produce high quality video images and sound. The system is highly resilient, adapting in real time to changing conditions in a network or to network errors due to data corruption or loss that can be produced, for example, by noise or line losses, thereby substantially eliminating fitter, signal packet loss or delay, or other errors which produce signal degradation.

17 Claims, 5 Drawing Sheets

ADAPTIVE VIDEO TELEPHONE SYSTEM

This application is a national stage application, filed under 35 U.S.C. §371, of International Application No. PCT/US2005/014554 with an international filing date of Apr. 27, 2005, and claims priority to U.S. Provisional Application No. 60/566,410, filed Apr. 30, 2004, each application of which is incorporated by reference in its entirety.

FIELD OF THE INVENTION

The present invention relates, in general, to video telephone systems for transmitting compressed video data over a network, and more particularly to adaptive systems for real time network error recovery for high quality video telephone communications.

BACKGROUND OF THE INVENTION

Traditionally, telephone and video communication systems have been bifurcated. Conventional telephone systems (or PSTN systems) operate at a bandwidth appropriate for voice communications, and typically provide spontaneous, point-to-point communications, such as two-way voice and data services, between two end users. In contrast, video distribution networks (including cable television systems), operate at a much broader bandwidth than telephone systems, and are usually employed to transmit pre-determined, high quality, full-motion video and audio concurrently to a plurality of subscribers.

It has long been felt that if the best features of voice and video communication systems could be combined appropriately, fully interactive video telephony would become feasible, and accordingly video telephony has been the subject of commercial development for many years. Although the first videophone appeared as early as the 1930s, a commercially viable videophone has yet to be introduced, even though significant efforts have been devoted to developing the same. This has been due, in large part, to the relatively high cost of videophones, their complexity both in design and use, their inability to concurrently provide quality image and sound, and their inability to provide a network infrastructure capable of two-way communications with minimal signal degradation.

Prior attempts at video telephony typically have resembled traditional business telephone desk sets with the addition of a display monitor and a camera, together with associated controls for operating the videophone. The cost of such devices has typically been in excess of $1000, which is above the level of affordability for many users, and this cost is compounded since at least two videophones are needed to make a video call. Furthermore, these devices are often relatively large, and not portable.

The quality of the image and sound in such prior videophones is typically substantially less than what is expected by most people for normal communications. Only a minimal capability, if any, is provided for accommodating different ambient conditions, or different audio characteristic (e.g., canceling ambient noise and feedback within the audio signal, accommodating concurrent conversations by both parties to the call). Furthermore, the signal processing utilized for such devices, including the techniques used for compressing and decompressing the resulting audio and video signals, has not been optimized with the result that the quality of both the transmitted and received video is much less than what is expected from a communications system. For example, varying ambient light conditions often result in over-exposed or under-exposed pictures. Movement of the user often results in both a significant degradation in image quality as well as the possibility that the camera can no longer capture the image of the user (e.g., outside of the limited range of view of the camera).

Because of the complexity of prior systems, there is a complicated set-up process to configure the videophone to the particular communications network being utilized. Even videophones that can work with multiple types of communications networks are far from "plug 'n' play" with any network. In addition, the videophone must be located where it can be directly connected to the available communication network via an Ethernet or comparable connection, severely limiting flexibility in locating and using the videophone. Since a videophone typically uses traditional IP addressing, a user must enter a number sequence that is different from what people are accustomed to as a standard phone number. Furthermore, there typically is no provision for telephone services and applications such as caller ID, call waiting, call forwarding, conferencing and the like.

Videophones are expected to work across long distances which encompass multiple networks and network infrastructures. Delays in transmissions and the presence of noise degrade the signal quality. Even though prior videophones have advertised high frame rates and transmission speeds, they do not typically achieve these speeds due to the upstream and downstream characteristics of communications networks or due to lossy networks which cause data to be corrupted or lost during transmission. This results in degraded images and sound quality, jitter, lack of synchronicity between the voice and video, etc.

In prior systems, attempts have been made to overcome degraded images, loss of synchronism between audio and video, jitter and delay through the use of feedback systems which detect errors such as missing data packets and request retransmission by the source. Such error recovery requires buffers for temporary storage of received signals, and produces delays in any communication between videophones. This lack of real time communication is unacceptable in videophone systems.

SUMMARY OF THE INVENTION

In accordance with the present invention, a videophone system is provided in which high resolution video transmission between videophones is achieved. Compressed video signals and audio signals may be transmitted through any communications network, with the system providing real time adaptive error recovery and synchronization between the audio and video signals to produce high quality video images and sound. The system is highly resilient, adapting in real time to changing conditions in a network or to network errors due to data corruption or loss that can be produced, for example, by noise or line losses, thereby substantially eliminating jitter, signal packet loss or delay, or other errors which produce signal degradation.

A videophone system may consist of a video source at one end and a video display at the other, connected by a medium that may be lossy, and may operate using an encoding technique in which data representing current video may depend on earlier pictures in the video. An example of such a system would be a pair of videophones, each with a camera and a display that shows video from the other phone, encoded using the standard video compression technique known as H.264, but connected by an unreliable network. The present invention provides ways to increase the quality and reliability of such a system.

An encoding scheme such as H.264 uses concepts such as I-slices, which are slices of a frame, or picture, encoded without being based on information in any other picture than the current one; P-slices, which are slices based on one or more previous "reference" slices, that are encoded frames used to encode future frames; SI-slices, which are I-slices that encode the same resultant data as a particular P-slice or SP-slice; and SP-slices, which are P-slices that encode the same resultant data as a particular P-slice or SP-slice by using a different set of reference slices. A frame will consist of one or more slices.

A reference slice is an encoded picture, or section of a picture, that is used as a reference for encoding future pictures. The data from a decoded reference slice is required to correctly decode one or more future pictures. If a reference slice is lost or damaged, then one or more future pictures cannot be correctly decoded.

A lossy network is one that may cause data to be corrupted or lost during transmission. Such a lossy network can cause disruption of a video stream by causing a reference slice to be lost or corrupted so that following pictures are impossible to correctly decode. Methods for reducing the severity and impact of a lossy network are part of the present invention.

Recording video transmissions, such as for saving messages, may require the ability to move around within a received stream at playback time, to provide features such as fast-forward, reverse, and skip. An original received stream may not have the features that make this possible, for including this information in the original transmission would reduce the picture quality or increase bandwidth usage, so a method for adding that information after reception is useful.

When a video signal is being recorded at the receiving end (such as for recording a video message), the received video can be processed immediately or later to add data that allows for fast-forward, rewind, and jumping to a point within the video stream. An example would be to take a stream of I-slices or P-slices and add SI and/or SP slices either into the recorded stream, or to create a second stream from which it is possible to switch into or back from the main stream.

Accordingly, the present invention is directed to a method and system for creating and processing compressed video streams and dealing with possible errors in the streams. Data within the stream may be protected against errors in an adaptive manner based, for example, on how important the data is, and such protection may be provided by duplication or other methods. Methods utilizing techniques such as thresholds can be used to select which pictures are used as reference slices to minimize the impact of protecting them from error.

In order to maximize the quality of the video, it is important to know which portions of the image are the most important to the viewer, and weighting those parts of the image to maximize the perceived quality of the picture. The areas that are important can be determined by using long-term motion and change information, or by using object recognition for objects such as faces. This allows more bits to be used for the areas that are more important to the viewer and fewer bits for other areas of the picture, even if there is motion or change in those less important areas in a particular picture.

If desired, the amount of motion in different areas of the pictures of the video stream may be used to weight the encoding process, such that more data is used to encode areas that have long-term histories of motion, especially in cases such as a "talking head" where the camera and subject are mostly in fixed positions. The areas to be weighted may be selected by using object recognition, such as by using face feature recognition to identify where on the picture a "talking head" is and where certain facial features are, such as the mouth and eyes.

Data from previous transmissions can be stored to provide an initial set of weights or other predictive data for encoding the video.

If desired, reference slices from previous calls from the same source can be saved by the receiver so that on the next transmission the encoder can use them at the start of the transmission instead of having to start with an I-slice, and so improve the video quality or reduce the bit rate. The initial set of reference slices may be standardized so that any transmission can make use of them to improve the video quality or reduce the bit rate.

In accordance with the invention, high-resolution video transmission is obtained by sending multiple copies of reference slices or otherwise providing methods for recovering reference slices, such as forward error correction, especially in the case where not every slice is a reference slice. In this way the likelihood that the reference slice will be unrecoverable is reduced. Any number of multiple copies can be sent, and the number of non-reference slices between reference slices can be any number including 0, and may vary in the video stream. The number of copies of reference slices, and/or the distance (or time) between reference slices is determined statically or dynamically by either the expected or measured error rates.

A video image is typically encoded with reference slices, and the selection of which slices are reference slices is done by using the amount of change in the video from the previous reference slice or slices, especially where a small number of reference slices is used, instead of selecting reference frames without regard to the content. This selection may be based on an adaptable threshold, so that if there is little change in the video over longer periods, the threshold for selecting a new reference slice would increase, and the threshold would decrease if the amount of change increased. The threshold value for creating a reference slice is held above a minimum based on how much extra bandwidth will be used by a reference slice versus how much adding a reference slice will reduce the number of bits to encode the video at the same quality level.

In order to adapt the encoded video stream to overcome errors caused in the network, a receiver is programmed to record the size and arrival time of each incoming packet, the time they were sent, and any apparent delay of the packet. If the accumulated data indicates that an error is occurring in the network, such as a delay caused by a network bandwidth that is too low, the receiver sends a message to the sender, telling it to reduce the bandwidth it is using, as by reducing the bit rate of the encoded data packets.

When the sender receives a message to reduce bandwidth, it responds by changing the data stream appropriately, as by setting a new data bit rate. The receiver allows the sender to process the request before it resumes measurements of the received signals, and the process is repeated. The system may be programmed to increase the bit rate by a percentage of the amount it was lowered if it has operated successfully for a set period of time at the lower bit rate.

The system of the invention is extremely resilient, in that it is capable of responding rapidly and in real time to the loss of data from the video stream. This resiliency is provided by programming the receiver to record whether or not each data packet that is transmitted is a reference slice. The receiver then responds to the received video stream to signal whether each packet was received or not received, and also records the status of that packet, updates the running estimate of incoming packet loss, and determines whether a lost packet contained a reference slice. Based on the running estimate of incoming packet losses, the sender is adjusted to send one of several possible mixes of reference slices and nonreference slices, varying from all reference slices to multiple nonreference slices between each reference slice, and/or changing the rate at which frames are sent. The mix of slices is changed dynamically as network conditions change, so that the resilience of the system is increased or decreased to tune the system as needed to produce the highest possible video quality.

Although the invention is described in terms of a videophone system, which represents its preferred embodiment, it will be understood that the methods, techniques and processes described herein are applicable to other similar communications systems.

BRIEF DESCRIPTION OF DRAWINGS

The foregoing, and additional objects, features and advantages of the present invention will be better understood from the following detailed description of preferred embodiments thereof, taken with the accompanying drawings, in which.

DETAILED DESCRIPTION OF PREFERRED EMBODIMENTS

Figure 1:
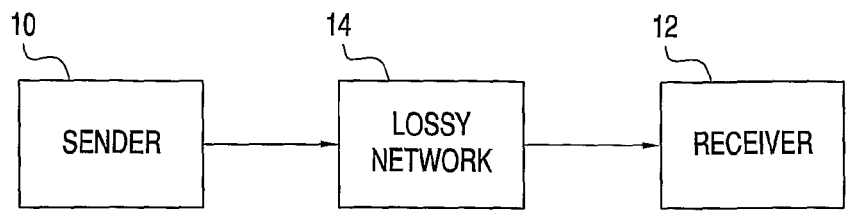
FIG. 1 is a block diagram of a videophone transmission system.

Turning now to a more detailed description of the invention, there is illustrated in FIG. 1 in block diagram form a simplified version of a videophone system in which a first videophone 10 is activated to send a video and audio signal to a receiver 12 by way of a network 14, which may incorporate any desired communications path such as cable, a wireless network, or the like. The receiver 12 preferably is also a videophone capable of transmitting video and audio signals to be received by videophone 10. Any number of videophones may be connected to the network, as is well known.

It is expected that network 14 usually will not be ideal, and will introduce delays or noise, or will otherwise corrupt data being transmitted, resulting in degraded images and loss of synchronization between transmitted audio and video signals. A primary feature of the present invention is the provision of real time correction of corrupted or lost data to produce high-resolution video images synchronized with the accompanying audio signals to produce enhanced videophone communication.

Video transmission systems typically use standard video compression techniques following one of the known standards identified as MPEG-4 AVC; MPEG-4 part 10; H.264; and H.26L. The videophone system of the present invention preferably utilizes the H.264 standard, and accordingly the following description will be based on that standard.

Figure 2:
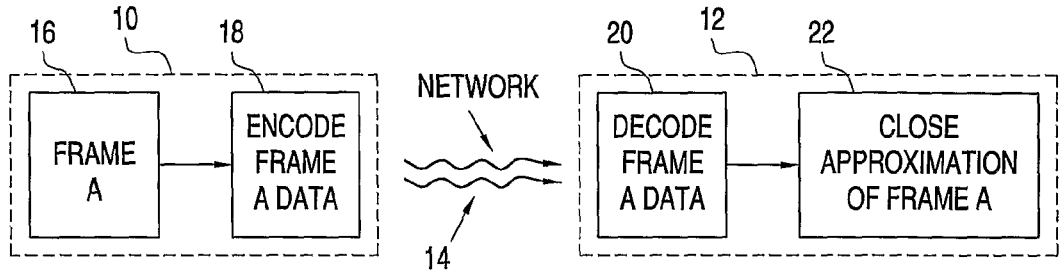
FIG. 2 is a block diagram of the data encoding process of the invention.
Figure 3:
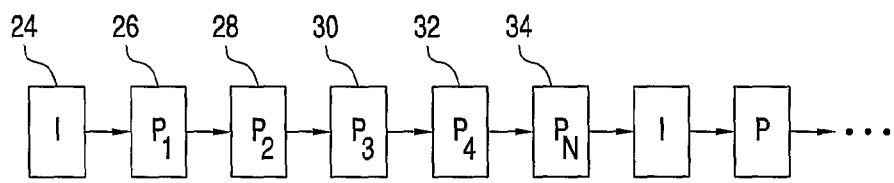
FIG. 3 is a diagrammatic illustration of a first image encoding technique in accordance with the invention.

The H.264 standard for video compression uses previous image frames to encode current data, with subsequent frames encoding the differences between succeeding images. As illustrated in FIG. 2, to start a sequence a first frame A is selected at sender 10, as indicated at 16, and is encoded, as at 18. The encoded data is transmitted by way of network 14 to a decoder 20 in receiver 12, where frame A, or a close approximation of frame A, is reproduced at 22 for display or for recording, or both. The encoding of the image represented by frame A may be carried out by digitally quantizing the image A to produce a frame of a given resolution, such as 176×144 pixels. The frame is divided into a series of macroblocks, each of which is typically 16 pixels×16 pixels, which are each encoded using the H.264 baseline profile standard. The encoder 18 compresses all of the macroblocks for the first frame to produce a data packet. The first data packet in a stream is typically encoded as an I-slice, which does not reference any previous frame data, and is indicated at 24 in FIG. 3. The I-slice data packet is transmitted, decoded at the receiver, and is used in a display raster scan to reproduce frame A.

Subsequent frames are encoded, but only the differences between a preceding frame and the next succeeding frame are encoded, to reduce the amount of data that needs to be transmitted. The subsequent encoded frames are data packets which are referred to as predictive slices of the image, and are illustrated as P-slices $P_1$-$P_N$ at 24, 26, 28, 30, 32 and 34 in FIG. 3. Under the H.264 standard, typically each previous P-slice is used to encode the current frame to produce a P-slice for transmission. Both the encoder and the decoder store the decoded data for each frame.

Since the coding of a P-slice $P_N$ depends on one or more previous frames, if one of the data packets is corrupted by the lossy network 14, subsequent data packets cannot be decoded without error. In prior systems, if a packet is lost or corrupted, the receiver 12 would send a feedback signal to the sender 10 to request a recovery transmission, which typically was done using an I-slice. Transmission of this recovery I-slice would typically use far more bits than a normal P-slice and thus would cause delay and/or increased bandwidth usage. In accordance with the present invention, such delays and/or increased bandwidth usage are avoided by sending the refresh via a P-slice based on previously known, correctly decoded frames. Thus, for example, if packets $P_2$ and $P_3$ are corrupted by noise in the network 14, packet $P_4$ would be encoded on the basis of data contained in the data packet represented by P-slice $P_1$, or, in some cases, on the basis of the data packet represented by I-slice 24. This allows the refresh to be done without any additional bandwidth usage and/or delay since the recovery P-slice is typically of similar size to a normal P-slice.

In accordance with the invention, in order to make the stream more resilient to loss introduced by the lossy network 14, the particular slices chosen as reference slices can be varied. Loss of a non-reference slice does not require recovery. The number of slices that are reference slices may vary adaptively during a videophone communication session, with the frequency at which a reference slice is chosen being dependent on, and responsive to, problems such as the nature and frequency of disturbances on the network and the network bandwidth available. Thus, the fewer number of reference slices in a stream, the less likely the system will need a recovery transmission. For example, the more errors that occur in the network, the less often reference slices are sent, and this can change continuously during a transmission to maintain image quality at the receiver. This reference frequency adjustment may be responsive to feedback signals from the receiver to the sender.

Figure 4:
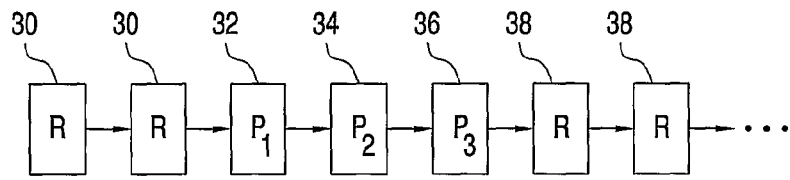
FIG. 4 is a diagrammatic illustration of a second encoding technique for recovery of recorded image signals.

In another form of the invention, error recovery is enhanced by duplication of data packets such as the R, or reference slice packet 30, as illustrated in FIG. 4. In this embodiment, important data packets may be sent two or more times to make sure that the data is received accurately, and that subsequent P-slices 32, 34, 36, etc., are accurately encoded and decoded. The number of non-reference slices can be varied, as discussed above, before another reference slice 38 is generated and transmitted two or more times. Alternatively, instead of transmitting a reference slice two or more times, other forms of forward error correction could be used.

The foregoing technique of adaptive data transmission based on network conditions improves over prior systems, in which the selection of reference slices is predetermined. Thus, the dynamic adaptation of the sender to changing network conditions provides improved image qualify.

Figure 5:
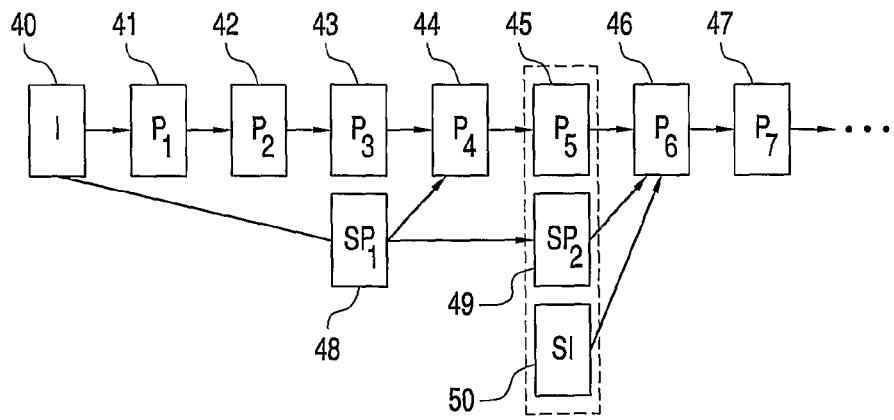
FIG. 5 is a diagrammatic illustration of a decoding process for data storage and playback.

The system of the present invention accommodates video messaging, wherein an incoming videophone call indicated by data packets 40-47 in FIG. 5 is stored at the receiver or at a data center for later playback. In the storage process, a secondary stream of data, incorporating $SP_1$, $SP_2$, etc., illustrated at 48 and 49, and SI, illustrated at 50 in FIG. 5, which allow the receiver to play back portions of the recorded message. The data packets $SP_1$, $SP_2$, etc., allow fast forwarding of the recorded message to start play at any P-slice data packet following the $SP_1$ data slice; for example, to allow playback to start at $P_4$. The reference data-switching packet SI allows rewinding the recorded message to the location of that packet, and starting the playback at data packet $P_6$, as illustrated. This transcoding of data packets enables the receiver videophone to record and then selectively play back a message from a sender videophone.

Figure 6:
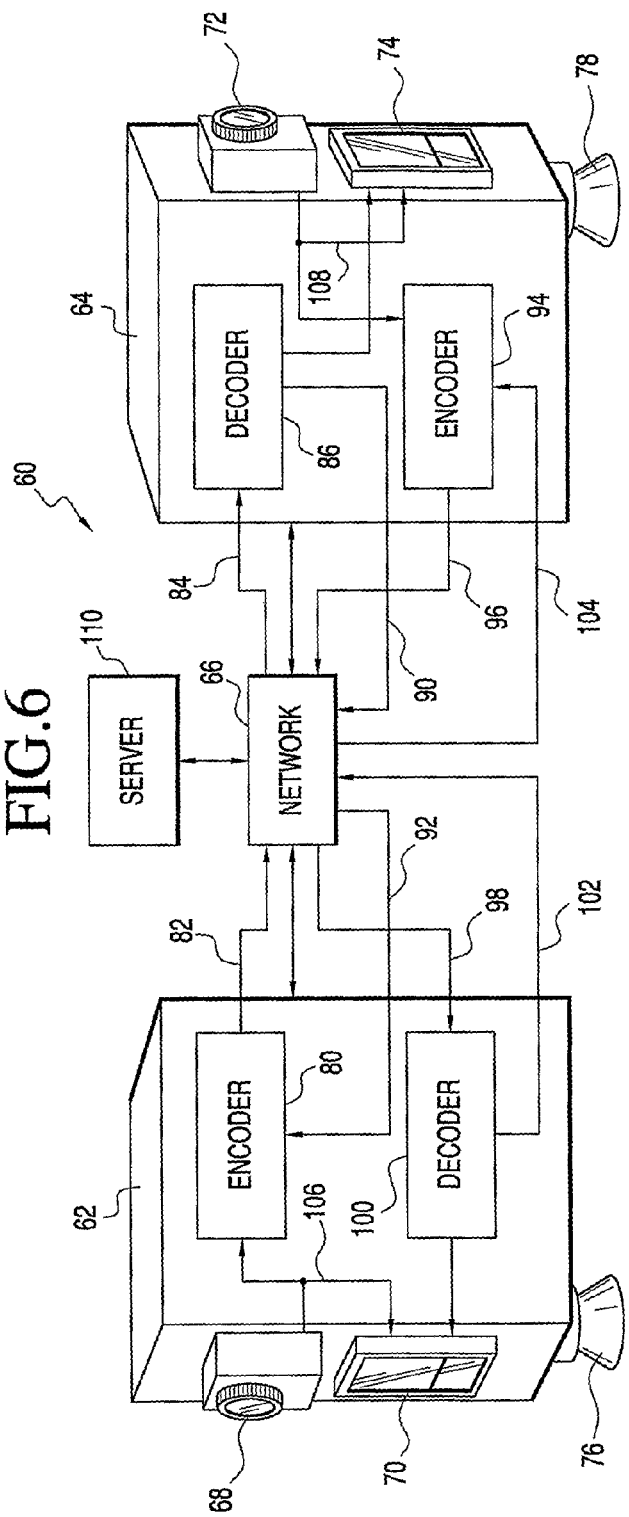
FIG. 6 is a more detailed diagrammatic illustration of the videophone communication system of FIG. 1.

A more detailed example of a videophone system in accordance with the invention is illustrated at 60 in FIG. 6, to which reference is now made. The system includes first and second videophones 62 and 64, both capable of transmitting and receiving audio and video signals through a common network 66. The network may be any communications network, either public or private, that is capable of carrying compressed video and audio signals. The first videophone 62 incorporates a conventional video camera 68 and a conventional video display 70, while the second videophone 64 similarly incorporates a video camera 72 and a video display 74. The videophones also incorporate suitable audio transducers 76 and 78, respectively. Video signals from camera 68 corresponding to an image to be transmitted are encoded at encoder 80 in the manner discussed above, and are transmitted by a conventional transmitter (not shown) in the videophone through output line 82 to network 66. The data sent by videophone 62 is received from the network by videophone 64 by way of input line 84 to a decoder 86 in videophone 64. The decoder acts on the received signals in the manner described above to produce an output which is displayed on display 74 to recreate the image detected by camera 68. The decoder tracks the received data, acknowledges its receipt by way of line 90, network 66, and line 92, and provides feedback information to encoder 80 to permit adaptation of the transmitted reference data packet frequency to any network problems detected at the decoder, as discussed above.

In similar manner, the videophone 64 receives images from camera 72, encodes them at encoder 94 in the manner discussed above, and transmits the resulting data packets by way of output line 96 through network 66 and input line 98 to decoder 100 in videophone 62 to display the transmitted image on display 70. The decoder tracks the receiver data packets and sends a feedback acknowledgement signal via line 102, network 66, and line 104 to encoder 94 to permit adjustment of the encoder output in response to network problems.

The Real Time Control Protocol (RTCP) standard is used to provide feedback data between the decoders and encoders. The encoders respond to the RTCP and determine what changes in the encoding process are required. For example, the encoder may respond to packet loss by decreasing the frequency of reference data packets, or may respond to an error signal by immediately sending a new reference data packet. The encoder tracks which frames are reference slices, and when a feedback signal indicates that data has been lost, the encoder determines whether it needs to make a recovery transmission and if so, whether it can recover via a P-slice or an I-slice. Each encoder is controlled to generate the desired data packet sequences, and the decoders respond to reproduce a high quality image. The decoder will incorporate sufficient memory to enable it to store the needed frames.

Audio signals received from the respective transducers 76 and 78 are transmitted between the videophones through the network 66 in conventional manner. The audio signals carry superimposed timing signals for synchronization with the video signals. In a preferred form of the invention, the video and audio data carry the same timing signals, and at the receiving end the video signals are slaved to the audio signals. If synchronization is lost, because of problems in the network, for example, video frames are either skipped or are repeated at the receiver to restore synchronization with the audio.

Figure 7:
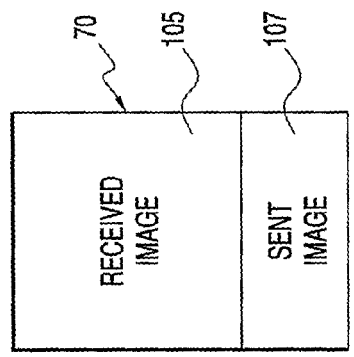
FIG. 7 is a diagrammatic illustration of a videophone display in accordance with the invention.

In a preferred form of the invention, as illustrated in FIG. 7, the video display 70 of videophone 62 not only displays images from videophone 64 as at receiver position 105 but in addition is connected as by way of line 106 to display the image 107 from camera 68 that is being transmitted by videophone 62. Similarly, camera 72 is connected by way of line 108 to display 74 so that the image detected by camera 72 is displayed at videophone 64. This allows the user of each videophone to monitor the image being transmitted.

If desired, a broadband modem, or server 110, can be connected to either or both videophones through the network 66 to supply data or images to a single videophone to permit the videophone to operate as a standalone receiver.

Figure 8:
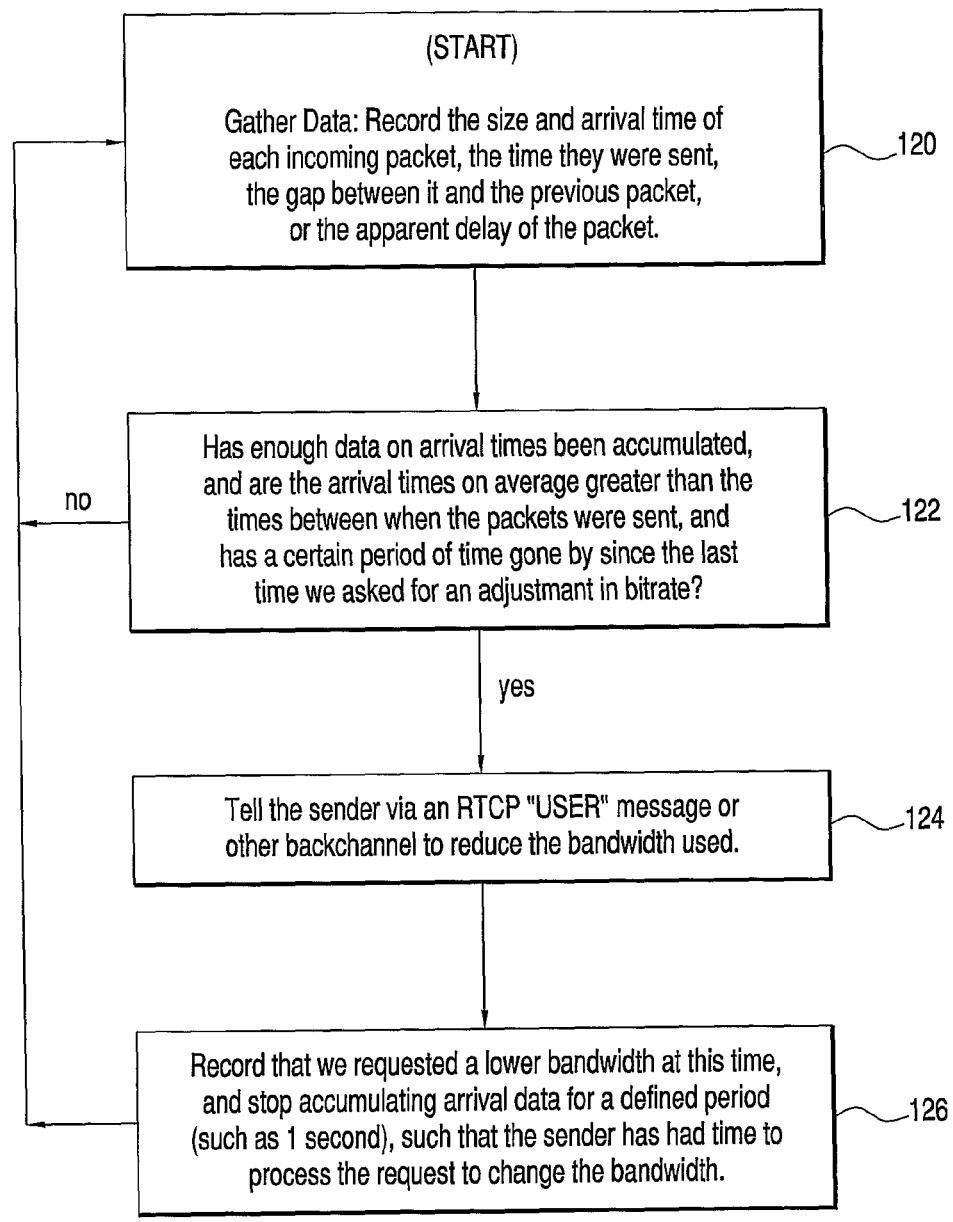
FIGS. 8-10 diagrammatically illustrate the adaptive receiver and transmitter-side process of the invention.
Figure 9:
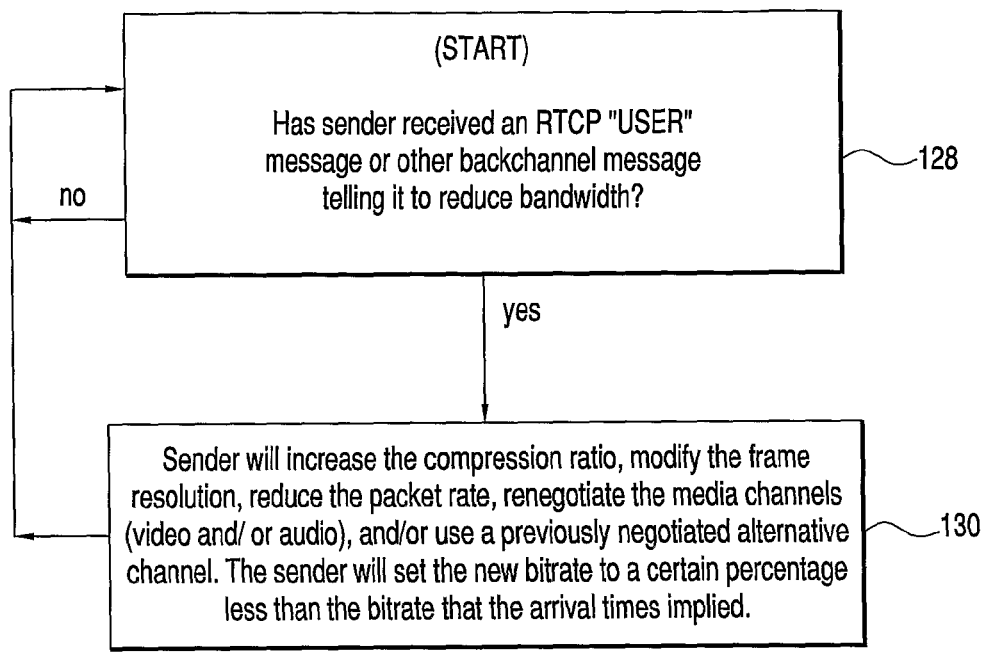
Figure 10:
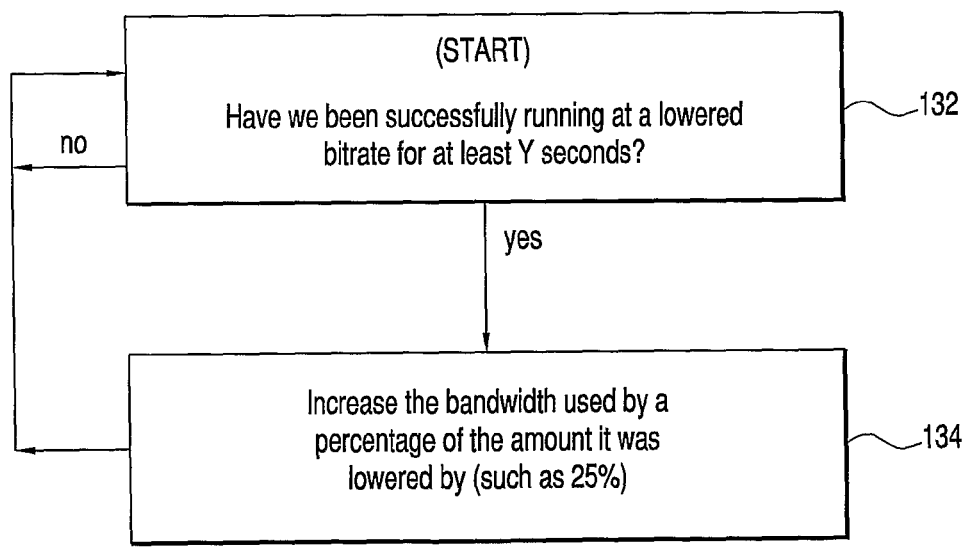

The adaptive mode of operation of a videophone receiver used in the present system is illustrated in the flow diagrams of FIGS. 8, 9 and 10, to which reference is now made. In this mode, a receiver (such as videophone 64) initially records the size and arrival time of each incoming data packet, the time it was sent (typically from the Real Time Protocol (RTP) time stamp), the gap between it and the previous packet, and any apparent delay of the packet, as described in block 120 of FIG. 8.

The sequence of packet arrival times/sizes is detected, and the sequence is examined to determine whether some link the packet has traveled over has a lower bandwidth than the videophones are attempting to use. This is implied if packets are arriving increasingly late by an amount that's consistent with the sizes of the packets.

If enough data on arrival times has been accumulated (block 122 in FIG. 8), and the arrival times are on average greater than the times between packets when the packets were sent, and a certain period of time has gone by since the last time an adjustment in the bit rate of the transmitted packets was requested, then the receiver tells the sender, via an RTCP "USER" message or other backchannel or feedback signal, to reduce the bandwidth used (block 124). The request for a lower bandwidth at this time is recorded, and arrival data is not accumulated for a defined period (such as ½ or 1 second), so that the sender has time to process the request to change the bandwidth (block 126).

When a sender receives an RTCP "USER" message or other backchannel message (block 128 in FIG. 9) telling it to reduce bandwidth, the sender may use one or more of the following mechanisms (block 130) to reduce the bandwidth being used:
  a) Increasing the compression ratio
  b) Modifying the frame resolution
  c) Reducing the packet rate
  d) Renegotiating the media channels (video and/or audio) or using a previously negotiated alternative channel.

The amount by which the sender would change the bandwidth would include all overheads (such as IP and RTP overhead), and the sender sets the new bit rate to a certain percentage less than the bit rate that the arrival times implied. For example, if data packets are being sent every 33 ms, are equal size, and are arriving every 44 ms on average (i.e. each packet is more delayed than the previous one), this would imply that some link the packet traveled over has a maximum bandwidth of roughly ¾ of the rate that is being sent. An RTCP "USER" packet specifying this arrival rate would be sent to the sender to process. The sender would then reduce its overall bit rate (including IP and RTP overhead) to somewhat less than ¾ of the previous bit rate.

If the system successfully runs at a lowered bit rate for a period, such as 4 seconds (block 132 in FIG. 10), then the bandwidth is increased, usually by a percentage of the amount it was lowered (such as 25%) (block 134). Alternatively, the bandwidth used could be increased regardless of whether it is below the initial bandwidth.

Figure 11:
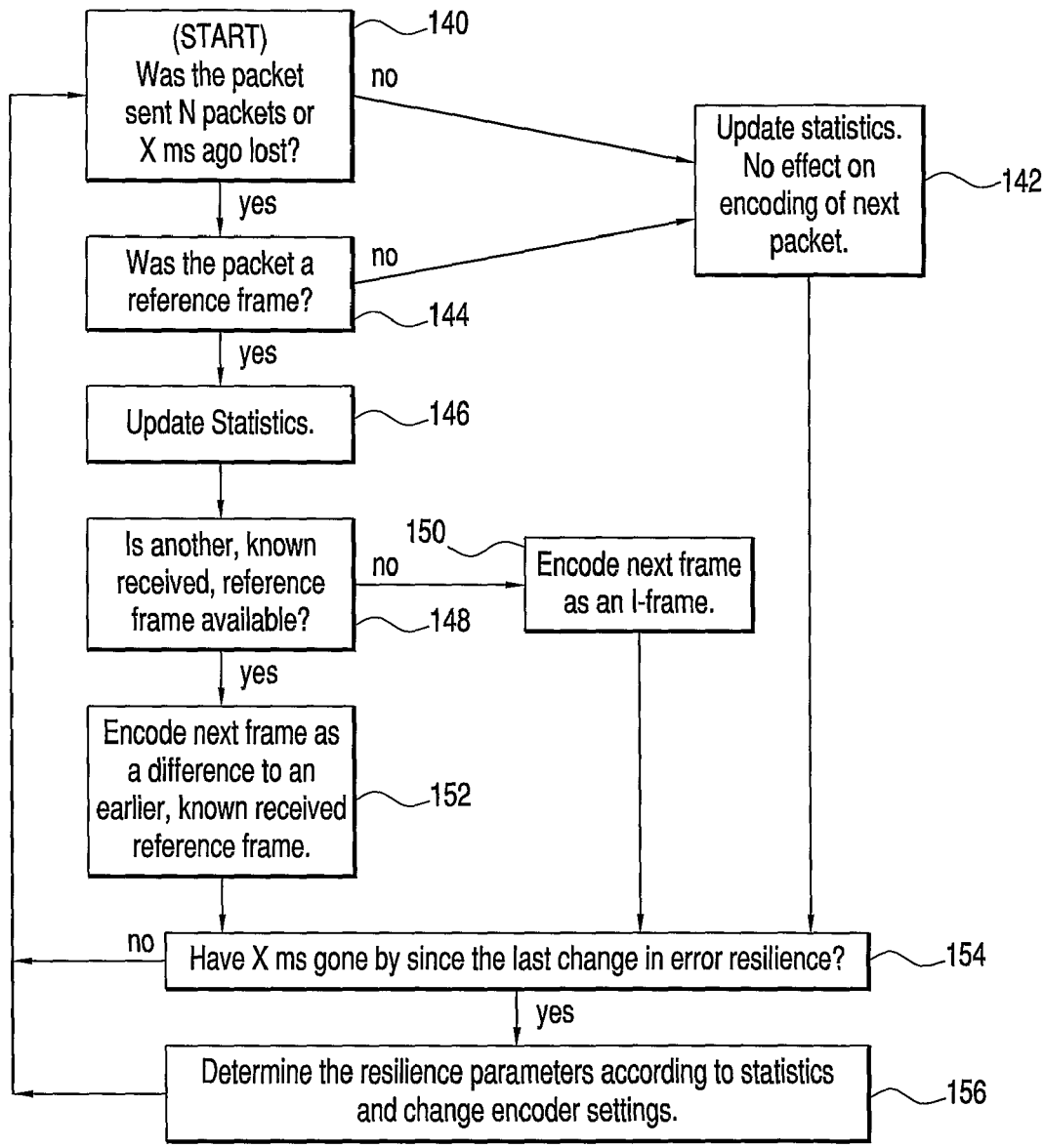
FIG. 11 diagrammatically illustrates the error resilience process of the invention.

The resilience of the present system in responding to errors is illustrated in the flow diagram of FIG. 11. As illustrated, as each packet is sent, the sender remembers if it was a reference slice, then it is determined whether each packet that was sent is known to be received or determined to be lost (block 140 in FIG. 11) via reports of acknowledgements (ACKs) and/or non-acknowledgements (NACKs) from the receiver. The sender records whether a packet was lost or received, updates the running estimate of incoming packet loss (block 142), and determines if the lost packet contained a reference slice (block 144), and if so, updates the sender statistics (block 146) and determines whether a reference slice known to have been received is available (box 148). If not, a reference slice will be transmitted (box 150); if so, a P-slice will be transmitted (box 152).

If a certain number of milliseconds have gone by since the last change in error resilience (box 154), then the sender determines which resilience parameters are appropriate for this expected level of loss and the encoder's settings are changed appropriately (box 156).

In one form of the invention, the following settings (modes) or resilience levels are available in the encoder:
  1. Pure P-slice stream, all reference slices.
  2. Every 2nd P-slice is a reference slice.
  3. Every 3rd P-slice is a reference slice.
  4. Every 4th P-slice is a reference slice.
  5. Every 4th P-slice is a reference slice, and reference slices are sent multiple times.
  6. Every 5th P-slice is a reference slice, and reference slices are sent multiple times.
  7. Every Nth slice is an I-slice, and the P-slices are not used for reference and reduce the frame rate to 15 frames per second.
  8. All I-slice mode, and the frame rate is reduced to 10 frames per second.

More modes could be provided, if desired, and the number of frames that are reference slices could be modified to produce the best subjective result.

The exact loss levels that are used to select different resilience levels are a tuning parameter for the system. For example, in one implementation of the invention, the loss levels may be less than 3%, 3%, 5%, 10%, 15%, 20%, 30%, and 50%, respectively, for the resilience modes 1-8 above. Alternatively, instead of fixed loss percentages to determine the resilience mode, the mode can be determined dynamically by counting how frequently and for how long the video at the receiver is incorrect because of a missing reference slice.

If reference slices are missing from the received data more often than a threshold, such as one missing reference slice per second, then the system responds to increase the resilience level. If reference slices are missing less often than a threshold, such as one missing reference slice every 2 seconds, then the system responds to reduce the resilience level. Whether a slice is a reference slice may depend on the change of scene in the camera image, or the amount of motion from one frame to another (as opposed to a fixed frequency, such as every 3 frames). This feature may be combined with any of the 8 resiliency levels above.

The quality of the image displayed at a receiver can be improved by weighting sections of an image frame, so that the face of a person communicating via the videophone will be emphasized over the less-important background. Areas where there is motion may be emphasized over static parts of the image, or image recognition techniques may be employed to emphasize specific features, such as a face, or parts of the face such as the eyes or mouth. Once areas of importance are identified, the quantization factor of the image (how much information is retained for transmittal, versus how much is discarded) can be adjusted, so that the quality of the image at the receiver is maximized.

It is noted that a single videophone can be used as a receiver, to receive data from a source such as the server 110 (FIG. 6), which could be a weather channel, traffic report, or the like which would periodically transmit an I-slice to ensure error resiliency.

When two videophones are communicating on a network, it is not necessary that they operate at the same resolution, or bit rate; they can operate asymmetrically, with each adapting to errors occurring in the connecting network. Each videophone will operate at a bit rate that provides the best connection, and this may depend, in part, on the network connections for each; for example, a particular phone may have a connection which enables it to receive at a higher bandwidth than is available for sending.

Although the invention has been described in terms of preferred embodiments, it will be apparent that numerous variations and modifications may be made without departing from the true spirit and scope thereof, as set out in the accompanying claims.

What is claimed is:
1. A video telephone system, comprising:
  a first videophone having a first camera connected to a first encoder and a first transmitter, and having a first decoder connected to a first display;
  the first videophone in communication with a second videophone, the second videophone having a second camera connected to a second encoder and a second transmitter, and having a second decoder connected to a second display;

the first encoder and first decoder of the first videophone and the second encoder and second decoder of the second videophone being interconnected by a network for video communication, wherein said first and second encoders are adaptively responsive to network-caused errors in said communication to provide real-time error recovery, wherein each of the first and second encoders is responsive to image video signals from its corresponding camera to encode data packets representing an image corresponding to the image video signals, wherein each of the first and second encoders produce additional data packets that represent only the differences between a first reference image frame and subsequent image frames, wherein, when an error produces an incorrectly decoded reference image frame, the first and/or second encoder will encode said subsequent image frames based upon previously known, correctly decoded frames.

2. The system of claim 1, wherein said encoders for said videophones transmit compressed audio and video signals through said network.

3. The system of claim 2, wherein said audio and video signals are synchronized.

4. The system of claim 1, wherein said data packets representing an image corresponding to the image video signals is dependent on data representing a prior image.

5. The system of claim 4, wherein the first decoder is in communication with the second encoder; and wherein the second encoder includes means responsive to changes in conditions in said network to adapt the second encoder to such changes.

6. The system of claim 5, wherein said means responsive to changes in conditions in said network includes at least one means to change the bandwidth requirement that is selected from the group consisting of:

modifying a frame resolution of transmitted video images,
reducing a packet rate of transmitted encoded video image data, or
changing said network.

7. The system of claim 1, wherein the first data packet is a reference for each subsequent data packet; and wherein reference data packets are produced at a predetermined frequency.

8. The system of claim 7, wherein the frequency at which the reference data packets are produced by an encoder is adaptively varied by the encoder in response to said network-caused errors.

9. The system of claim 1, wherein first and second transceivers are video telephones.

10. The system of claim 1, wherein said network produces errors in video communication due to data corruption or loss.

11. The system of claim 10, wherein said adaptively responsive first and second encoders respond in real time to data corruption or loss in said network to provide said error recovery.

12. The system of claim 11, wherein said error recovery is based on previously-transmitted reference data.

13. The system of claim 1, further including means for storing or displaying received video in each of first and second videophones.

14. A method of high resolution video communication, comprising:

transmitting compressed video data signals representing an image through a network;
detecting network-caused errors in said video data signals;
adaptively changing said video data signals in real time to provide error recovery; and
storing or displaying said video image,
wherein adaptively changing said video data signals packets in real time comprises encoding a subsequent packet of video data signals to produce a signal packet representing the difference between a subsequent frame and a reference frame packet upon detection of network-caused errors,
wherein the reference frame packet was incorrectly decoded or the reference frame packet was generated from a previous packet that was not received or incorrectly decoded.

15. The method of claim 14, wherein transmitting compressed video signals includes:

obtaining a series of video image frames;
encoding a first frame to generate a first packet of video data signals;
encoding subsequent frames to generate corresponding subsequent video data packet signals; and
supplying said data packet signals sequentially to said network.

16. The method of claim 14, further includes producing multiple frame reference packets for a set of subsequent packets.

17. The method of claim 14, further includes producing a reference data packet for a set of subsequent frame data packets, wherein providing error recovery includes varying the frequency at which the reference data packets are produced.

* * * * *